United States Patent
Tsai et al.

(10) Patent No.: US 8,391,559 B2
(45) Date of Patent: Mar. 5, 2013

(54) METHOD AND SYSTEM FOR IMAGE IDENTIFICATION AND IDENTIFICATION RESULT OUTPUT

(75) Inventors: Ya-Hui Tsai, Pingjhen (TW); Kuo-Tang Huang, Pingzhen (TW); Yu-Ting Lin, Sanchong (TW); Chun-Lung Chang, Hsinchu (TW); Tung-Chuan Wu, Hsinchu (TW)

(73) Assignee: Industrial Technology Research Institute, Hsin-chu (TW)

( * ) Notice: Subject to any disclaimer, the term of this patent is extended or adjusted under 35 U.S.C. 154(b) by 857 days.

(21) Appl. No.: 12/512,575

(22) Filed: Jul. 30, 2009

(65) Prior Publication Data

US 2010/0189364 A1    Jul. 29, 2010

(30) Foreign Application Priority Data

Jan. 23, 2009 (TW) .............................. 98103331 A

(51) Int. Cl.
  *G06K 9/00* (2006.01)
  *G06K 9/03* (2006.01)
  *G06K 9/68* (2006.01)
(52) U.S. Cl. ........ 382/105; 382/104; 382/176; 382/177; 382/181; 382/190; 382/209; 382/218; 382/220
(58) Field of Classification Search .................. 382/105, 382/104, 176, 177, 181, 190, 209, 218, 220
See application file for complete search history.

(56) References Cited

U.S. PATENT DOCUMENTS

| | | | | |
|---|---|---|---|---|
| 5,136,658 A | * | 8/1992 | Mori | 382/105 |
| 5,315,664 A | * | 5/1994 | Kumagai | 382/105 |
| 5,651,075 A | * | 7/1997 | Frazier et al. | 382/105 |
| 6,038,342 A | * | 3/2000 | Bernzott et al. | 382/173 |
| 6,185,338 B1 | * | 2/2001 | Nakamura | 382/229 |
| 6,272,244 B1 | * | 8/2001 | Takahashi et al. | 382/190 |
| 6,553,131 B1 | * | 4/2003 | Neubauer et al. | 382/105 |
| 6,754,369 B1 | * | 6/2004 | Sazawa | 382/105 |
| 2010/0272359 A1 | * | 10/2010 | Fosseide et al. | 382/182 |

FOREIGN PATENT DOCUMENTS

| | | |
|---|---|---|
| CN | 1268234 A | 9/2000 |
| TW | 197752 | 3/2004 |
| TW | I286027 | 8/2007 |
| TW | 200802137 | 1/2008 |

\* cited by examiner

*Primary Examiner* — Michael A Newman
(74) *Attorney, Agent, or Firm* — Rabin & Berdo, P.C.

(57) ABSTRACT

The present invention provides a method and system for image identification and identification result output, wherein a feature image under identification acquired from an image is compared with a plurality of sample images respectively stored in a database so as to obtain a plurality of similarity indexes associated with the plurality of sample images respectively. Each similarity index represents similarity between the feature image and the corresponding sample image. Thereafter, the plurality of similarity indexes are sorted and then a least one of comparison results is output. The present invention is further capable of being used for identifying identification marks with respect to a carrier. By sorting the similarity index with respect to each feature forming the identification marks, it is capable of outputting many sets of combinations corresponding to the identification marks so as to improve speed for targeting suspected carrier and enhance the identification efficiency.

20 Claims, 11 Drawing Sheets

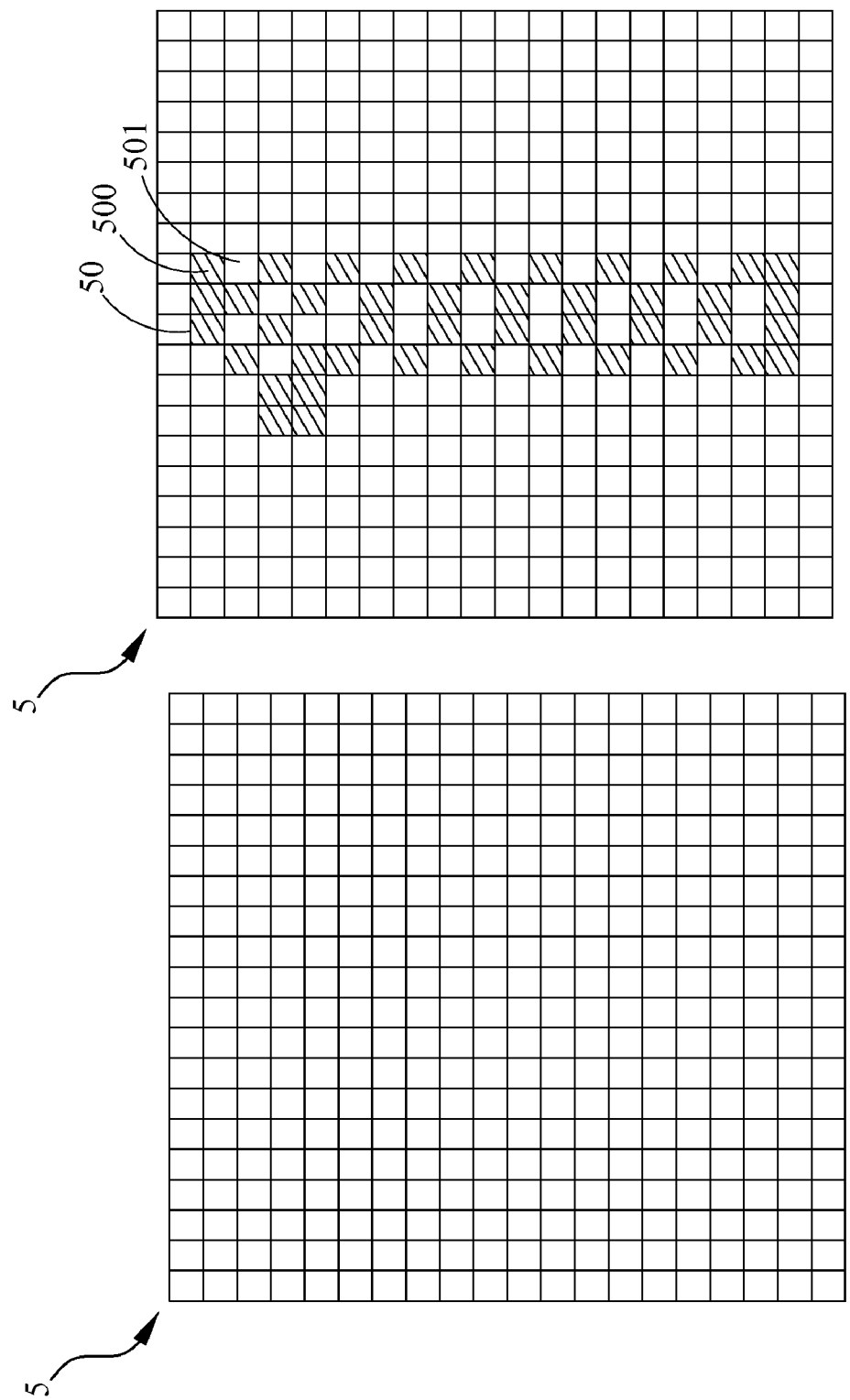

|  |  | 1 | 6 | 3 | 2 |  | F | V |
|---|---|---|---|---|---|---|---|---|
| 1st Possible Result | Character | 1 | 6 | 3 | 2 | - | F | V |
| | Similarity Index | 72 | 52 | 67 | 72 | | 63 | 76 |
| 2nd Possible Result | Character | 8 | 8 | 9 | 9 | - | H | W |
| | Similarity Index | 16 | 41 | 62 | 40 | | 50 | 54 |
| 3rd Possible Result | Character | 6 | 0 | 8 | 3 | - | M | J |
| | Similarity Index | 14 | 30 | 45 | 37 | | 45 | 45 |
| 4th Possible Result | Character | 3 | 4 | 0 | 0 | - | R | X |
| | Similarity Index | 0 | 24 | 36 | 18 | | 43 | 43 |

FIG.8A

METHOD AND SYSTEM FOR IMAGE IDENTIFICATION AND IDENTIFICATION RESULT OUTPUT

1. FIELD OF THE INVENTION

The present invention generally relates to an image identification technology and, more particularly, to a method and a system for image identification and identification result output by comparing a feature image under identification with a plurality of sample images respectively so as to obtain a plurality of similarity indexes associated with the plurality of sample images respectively. The similarity indexes are sorted and then a least one of comparison results is output.

2. BACKGROUND OF THE INVENTION

There are many people who get killed in traffic accidents. Theft and burglary using cars/motorcycles have been repeatedly reported. These may be attributed to poor image identification of license plates because of poor monitoring systems. Such monitoring systems are mostly problematic because of poor resolution (320×240 pixels) and slant angles of the image acquiring units to cause blur or incomplete images that cannot be recognized so that the criminals can be at large.

Conventionally, in Taiwan Patent No. 197752, a CCD camera and an image acquiring unit are used to acquire a car image in the car lane and the car image is then read by an image reading unit. Then, a logarithmic greyscale operation unit is used to calculate the logarithmic greyscale of each pixel in the car image. The image corresponding to the logarithmic greyscales is decomposed by a wavelet decomposition unit into rough images, horizontally differentiated images, vertically differentiated images and diagonally differentiated images. An image binarization unit converts the logarithmic greyscale of each pixel in the horizontally differentiated images from real numbers into binary digits 0 and 1. A rough image dividing unit determines a region with the highest sum of binary digits within the whole car image according a pre-set license plate size and thus the region is initially referred to as a license plate region. Then, a license plate slantness correction unit corrects the slantness of the image corresponding to the license plate region. Finally, a fine image dividing unit removes the part that does not correspond to the license plate from the rough license plate region.

Moreover, in Taiwan Patent Pub. No. 1286027, an integrated multiple lane free flow vehicle enforcement system is disclosed, wherein a portal framed equipment is established at the image enforcement point. The car lane is physically divided so that image enforcement can be realized with respect to various cars even though the system slows the cars to pass by the image enforcement point at a normal speed and to change lanes freely.

Moreover, in Taiwan Patent Appl. No. 200802137, a serial license plate identification system is disclosed, using a license plate character region detection module to receive an image and determine each approximate license plate range in the image. Sequences of serial identical pixels in each approximate license plate range are obtained. The sequences of serial identical pixels are erased, filtered, and connected to blocks so as to obtain the image with respect to the license plate character region in each approximate license plate range and output verified image with respect to the license plate character region after verification. Then, the verified image with respect to the license plate character region is transmitted to the a license plate character dividing and identification module to acquire all the independent character images and thus all the license plate character information after the independent character images are identified.

SUMMARY OF THE INVENTION

The present invention provides a method and a system for image identification and identification result output, wherein pixels in the sample images are provided with different weights and then calculated with images to be identified to obtain similarity indexes, which are to be sorted to output a least one of comparison results.

The present invention provides a method and a system for image identification and identification result output, which can be used to identify the identification mark on a carrier. With the use of the identification mark, word feature is enhanced. The word identification technology is used to obtain a plurality of results and limit the range of search, which helps the user to identify cars that are suspected to cause accidents.

In one embodiment, the present invention provides a method for image identification and identification result output, comprising steps of: providing an image; acquiring a feature image from the image; providing a plurality of sample images, each having respectively a standard image region and at least a non-standard image region, wherein the standard image region has pixels corresponding to a first feature value respectively, and the non-standard image region has pixels corresponding to a second feature value respectively; performing a calculation on a third feature value of each pixel in the feature image and the first feature value or the second feature value corresponding to each pixel in the plurality of sample images to obtain a similarity index of the feature image corresponding to the plurality of sample images respectively; collecting a plurality of similarity indexes with respect to the feature image compared with the plurality of sample images; and sorting the plurality of similarity indexes and outputting at least one of comparison results.

In another embodiment, the present invention provides a method for image identification and identification result output, comprising steps of: providing an image of a carrier with an identification mark thereon; acquiring from the image a plurality of feature images with respect to the identification mark; providing a plurality of sample images, each having respectively a standard image region and at least a non-standard image region, wherein the standard image region has pixels corresponding to a first feature value respectively, and the non-standard image region has pixels corresponding to a second feature value respectively; performing a calculation on a third feature value of each pixel in the plurality of feature images and the first feature value or the second feature value corresponding to each pixel in the plurality of sample images to obtain a similarity index of each feature image corresponding to the plurality of sample images respectively; collecting a plurality of similarity indexes with respect to each feature image compared with the plurality of sample images; and sorting the plurality of similarity indexes corresponding to the identification mark and outputting at least one of comparison results.

In one embodiment, the present invention further provides a system for image identification and identification result output, comprising: a database capable of providing a plurality of sample images, each having respectively a standard image region and at least a non-standard image region, wherein the standard image region has pixels corresponding to a first feature value respectively, and the non-standard image region has pixels corresponding to a second feature value respectively; an image acquiring unit capable of acquiring an image of an object; a feature acquiring unit capable of acquiring a feature image from the image; an operation and processing unit capable of performing a calculation on a third feature value of each pixel in the feature image and the first feature value or the second feature value corresponding to each pixel in the plurality of sample images to obtain a similarity index of the feature image corresponding to the plurality of sample images respectively, and sorting the plurality of similarity indexes and outputting at least one of comparison results; and an identification and output unit being connected to the operation and processing unit to output the comparison result identified by the operation and processing unit.

BRIEF DESCRIPTION OF THE DRAWINGS

The objects and spirits of the embodiments of the present invention will be readily understood by the accompanying drawings and detailed descriptions, wherein:

FIG. 3A is a schematic diagram of a sample image;

FIG. 3B is a schematic diagram showing a standard image region in a sample image;

FIG. 8A is a table for sorting the comparison results according to the present invention;

DETAILED DESCRIPTION OF THE PREFERRED EMBODIMENT

The present invention can be exemplified but not limited by various embodiments as described hereinafter.

Figure 1:
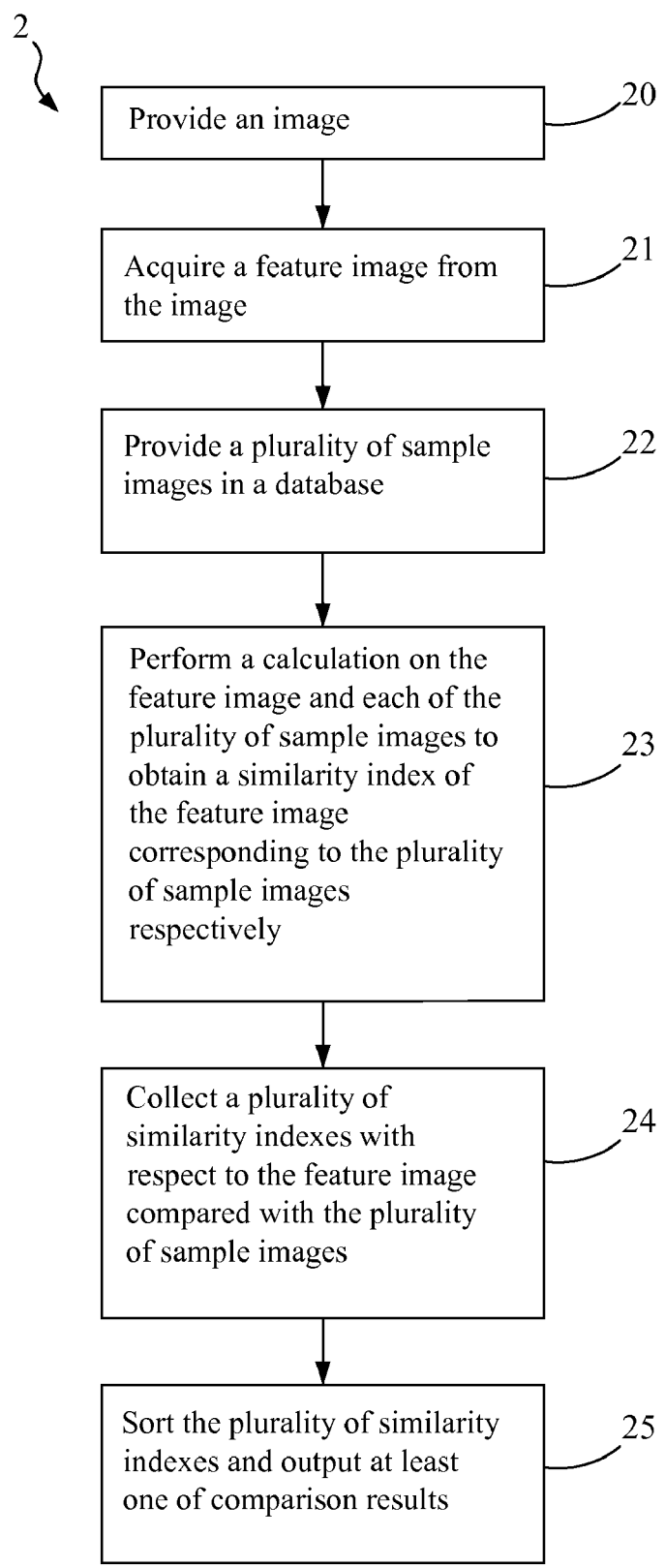
FIG. 1 is a flowchart of a method for image identification and identification result output according to one embodiment of the present invention.

Please refer to FIG. 1, which is a flowchart of a method for image identification and identification result output according to one embodiment of the present invention. In the present embodiment, the method starts with step 20 to provide an image. The image is acquired by an image acquiring unit such as a CCD or CMOS image acquiring unit. Then, step 21 is performed to acquire a feature image from the image. The feature image denotes the image comprising features such as patterns or words, but not limited thereto. The feature image can be acquired manually or automatically. Then, step 22 is performed to provide a plurality of sample images, each having respectively a standard image region and at least a non-standard image region. The standard image region has pixels corresponding to a first feature value respectively, and the non-standard image region has pixels corresponding to a second feature value respectively.

Figure 2:
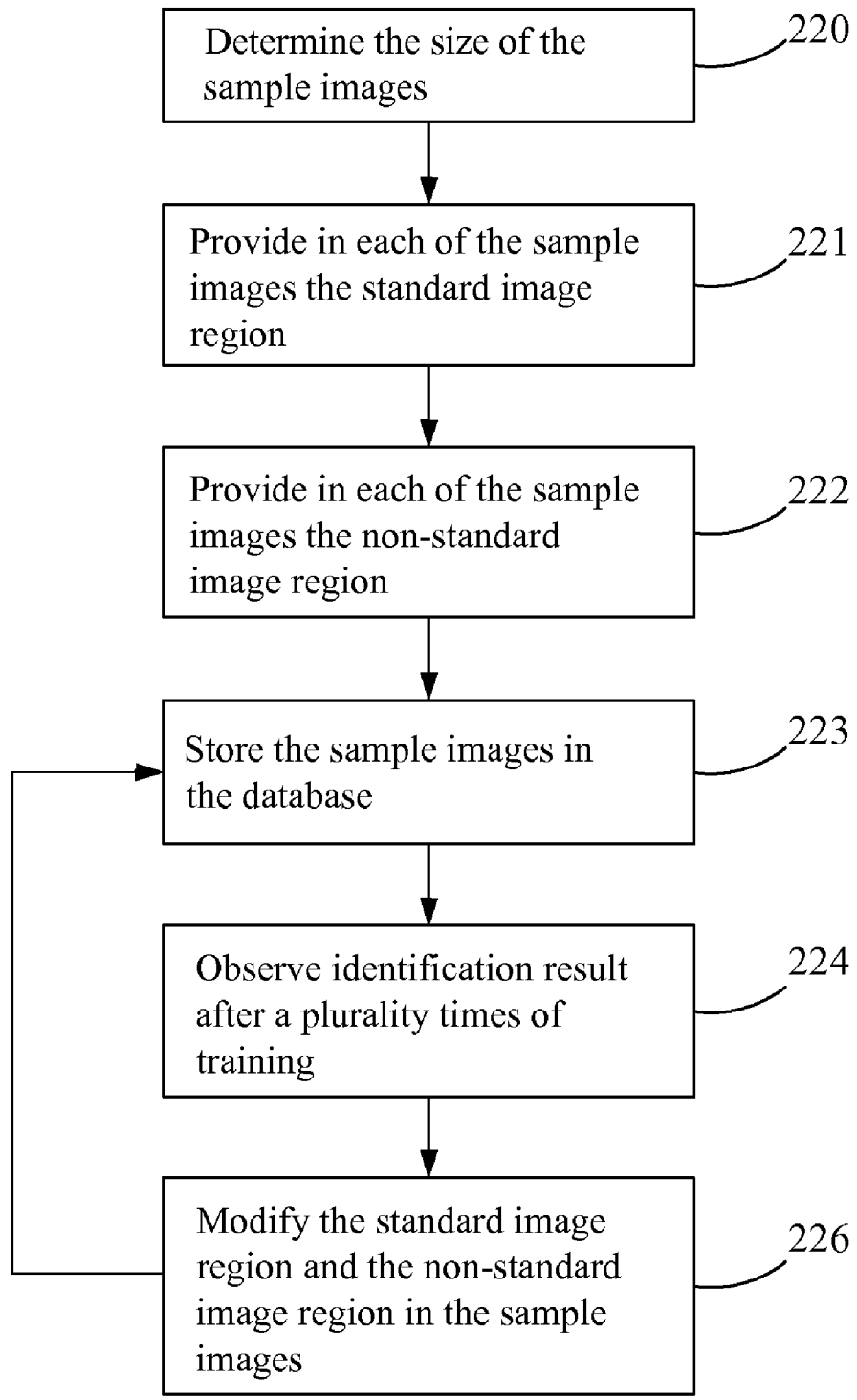
FIG. 2 is a flowchart of a step of providing sample images according to the present invention.

Please refer to FIG. 2, which is a flowchart of a step of providing sample images according to the present invention. Firstly, step 220 determines the size of the sample images, as shown in FIG. 3A. The size of the sample image 5 is determined according to the user's demand, for example, 130×130 pixels, but not limited thereto. Then, step 221 is performed to provide the standard image region 50 in the sample image 5. The standard image region 50 comprises a plurality of pixels 500 and 501 to form a character, a digit, a word or a pattern as represented by the sample image. Referring to FIG. 3B, the present embodiment is exemplified by a digit "1". In the sample image 5, each pixel 500 and 501 is given a proper greyscale value to form a standard image region 50, which draws the outline of the digit 1. Then, in the standard image region 50, specific pixels 501 (pixels with oblique lines) are given a specific weight value. The greyscale value and the weight value are determined according to the user's demand. That is, each weight value may be different or identical. In the present embodiment, the weight value is positive. In the standard image region 50, the greyscale value and the weight value for each pixel 500 and 501 are combined as the first feature value.

Figure 3D:
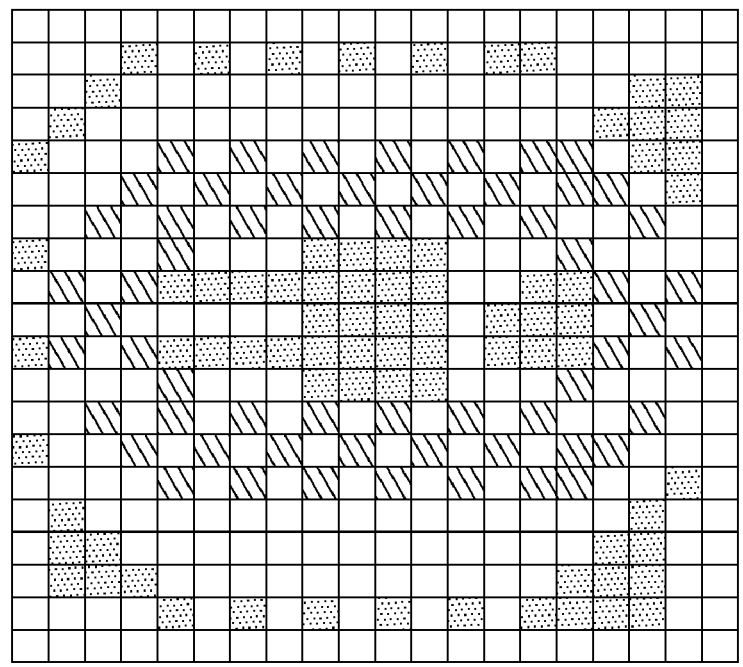
FIG. 3C and FIG. 3D are respectively a schematic diagram showing a standard image region and a non-standard image region in a sample image.
Figure 3C:
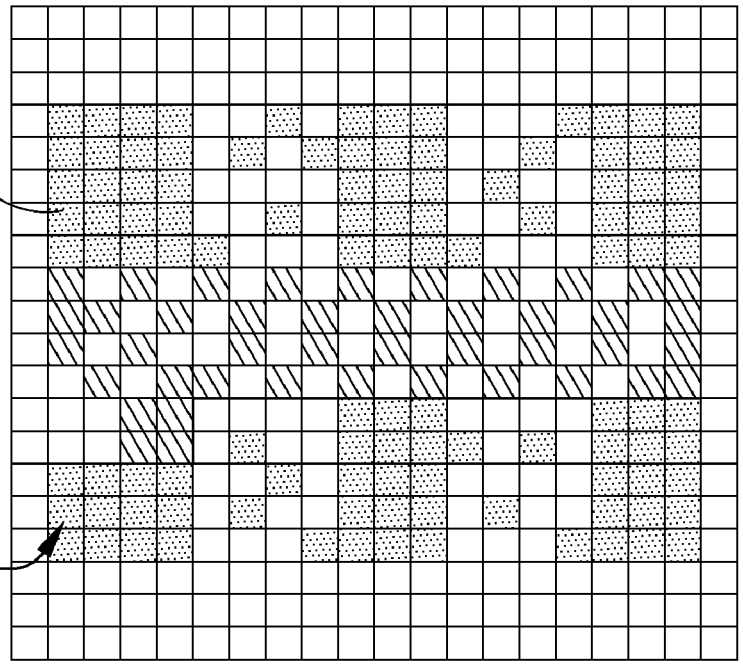

Referring to FIG. 2, step 222 is performed to provide in the sample image the non-standard image region 51 as shown in FIG. 3C. The non-standard image region 51 represents the content that the standard image region 50 is taken for. For example, digit "1" is often taken for letter "I" or "L" or even letter "E". Therefore, locations for pixels 510 possibly mis-identified (pixels with dots) are given proper greyscale values and weight values as the second feature values corresponding to pixels 510. In the present embodiment, locations for the pixels 510 in the non-standard image region 51 are determined according to the easily mis-identified character, digit or word in the standard image region 50, which is not restricted. The greyscale values and weight values are determined according to practical demand. In the present embodiment, the weight values in the non-standard image region 51 are negative.

As shown in FIG. 3D, which is a schematic diagram showing another sample image 5a provided according to digit 0, the sample image 5a also comprises a standard image region and a non-standard image region. The pattern constructed by the pixels in the standard image region draws the outline of a digit "0". Similarly, the pattern constructed by the pixels in the non-standard image region denotes a word that digit "0" is taken for. For example, digit "0" is often taken for letter "Q" or digit "8". Steps 221 and 222 can be performed using image processing software exemplified by, but not limited to, MS Paint.

Referring to FIG. 2, step 223 is performed to store the sample images, such as 0 to 9, A to Z and a to z, in the database. Then, in step 224, the identification result is observed after a plurality times of training. In the present step, different images are compared with the database for identification and calculation to identify whether the result is correct. After the plurality times of testing, step 225 is performed to modify the weight values, greyscale values or locations of pixels in the standard image region and the non-standard image region in the sample images according to the result in step 224.

Referring to FIG. 1, after the plurality of sample images are provided, step 23 performs a calculation on a third feature value of each pixel in the feature image and the first feature value or the second feature value corresponding to each pixel in the plurality of sample images to obtain a similarity index of the feature image corresponding to the plurality of sample images respectively. The third feature value is a greyscale value of each pixel in the feature image. Before step 23, since the distance and angle for acquiring the feature image influence the following identification, the feature image is normalized to adjust the size and the angle of the feature image so that the size of the feature image is identical to the size of the sample image after acquiring the feature image. The normalization processing is conventionally well known, and thus description thereof is not presented herein.

Figure 4:
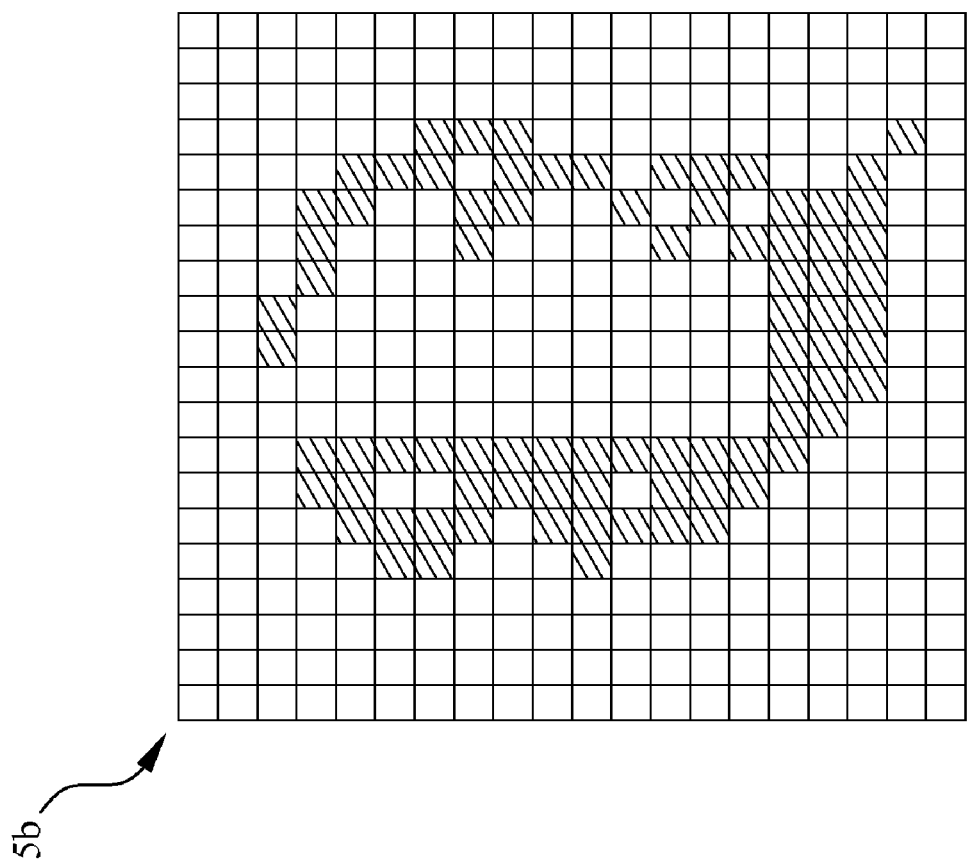
FIG. 4 is a schematic diagram showing a normalized feature image.

Please refer to FIG. 4, which is a schematic diagram showing a normalized feature image. The normalized feature image can be processed with each of the sample images for further calculation to obtain a corresponding similarity index $C_{uv}$. The calculation is based on normalized correlation matching, as described in equation (1). Normalized correlation matching is aimed at calculating the relation between the feature image and the sample image, wherein the standard deviation of the greyscale value of each image is regarded as a vector and is multiplied with the weight value so as to determine the optimal location. The standard correlation value is within the range between −1 and 1 with higher similarity as it gets closer to 1. When $C_{uv}$ reaches its maximum, an optimal location is achieved.

$$C_{uv} = \frac{\sum (u_i - \bar{u})(v_i - \bar{v}) \times w_i}{[\sum (u_i - \bar{u})^2 \sum (v_i - \bar{v})^2]^{1/2}} \quad (1)$$

wherein $u_i$ is the greyscale value of each pixel in the sample image, while $v_i$ is the greyscale value of each pixel in the feature image, i.e., the third feature value. Moreover, $\bar{u}$ is the average greyscale value of all the pixels in the sample image, while $\bar{v}$ is the average greyscale value of all the pixels in the feature image. $w_i$ is the weight value of the pixels in the standard image region and the non-standard image region in the sample image. The weight value of pixels in the other region is 1.

Based on equation (1), a calculation is performed on each pixel in FIG. 4 and each pixel in the sample image. For example, FIG. 4 and the sample image (representing digit 1) in FIG. 3C (representing digit 1) and the sample image in FIG. 3D (representing digit 0) are calculated to obtain the similarity index $C_{uv}$ of the feature image in FIG. 4 corresponding to FIG. 3C and FIG. 3D. Referring to FIG. 1, after obtaining the similarity index, step 24 is performed to collect a plurality of similarity indexes with respect to the feature image compared with the plurality of sample images. In the present step, the similarity indexes are sorted from the identification result with highest possibility to the identification result with lowest possibility. Finally, in step 25, the comparison results are output.

Figure 5:
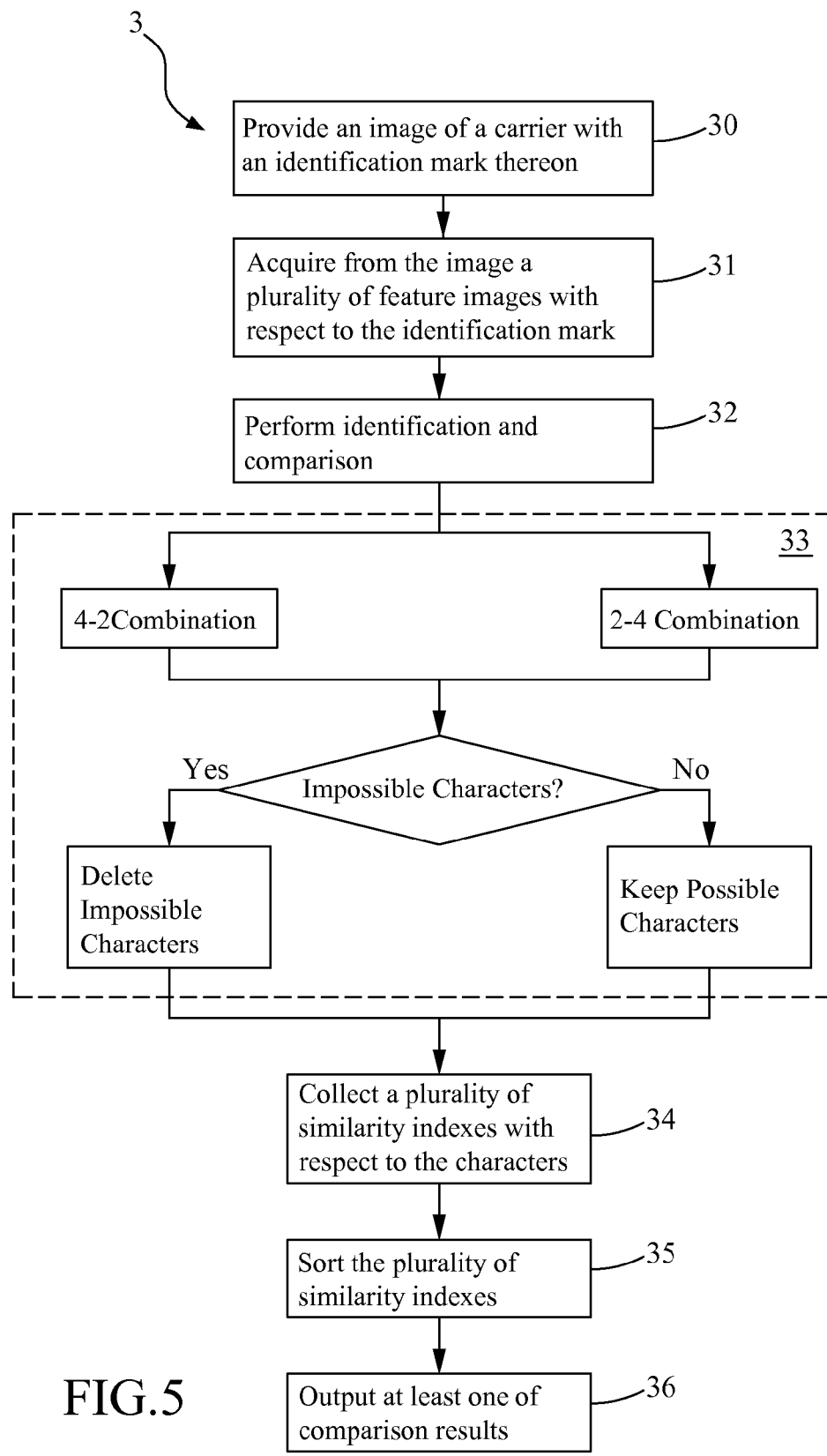
FIG. 5 is a flowchart of a method for image identification and identification result output according to another embodiment of the present invention.
Figure 6:
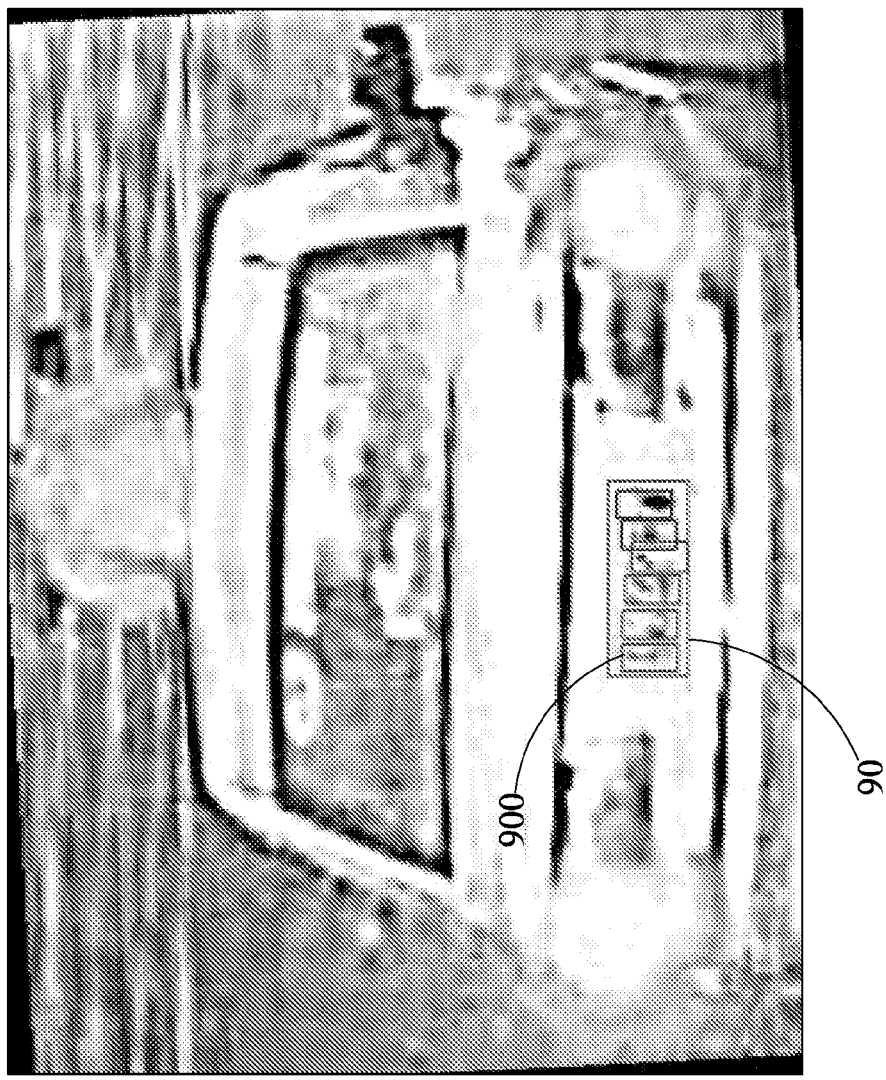
FIG. 6 is a blur image of a car.

Please refer to FIG. 5, which is a flowchart of a method for image identification and identification result output according to another embodiment of the present invention. The flowchart of the method 3 is exemplified by the identification of an identification mark (such as a license plate) on a carrier (such as a car). Firstly, step 30 is performed to provide an image of a carrier with an identification mark thereon. In order to achieve traffic safety or to reconstruct an accident event, an image acquiring unit is often installed on one side of the road or at the crossroad so as to acquire dynamic images or static images of the accident event. In step 30, the static images can be acquired from the recorded dynamic images. Then, step 31 is performed to acquire from the image a plurality of feature images with respect to the identification mark. As shown in FIG. 6, which is a blur image of a car. In the present embodiment, the carrier is a car with wheels and the identification mark is the license plate number. In the present embodiment, there are 7 characters forming the license plate number, wherein the leading four characters are digits and last two characters are letters. The license plate number is formed with various formats of characters for different countries, which is not limited to the present embodiment. In step 31, the content on the license plate is to be identified. Therefore, a plurality of feature images 900 can be acquired in the region of interest (ROI) 90 in FIG. 6 corresponding to the license plate. Each feature image represents respectively one character of the identification mark. The feature image can be acquired manually or automatically with the use of software.

Figure 7B:
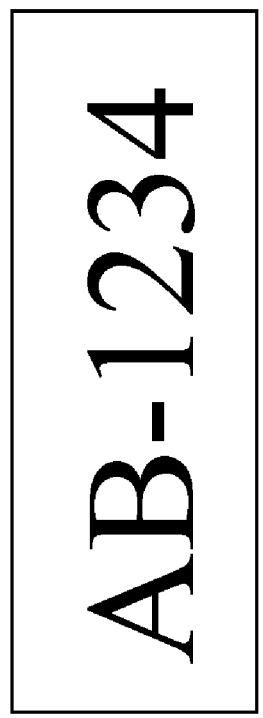
FIG. 7A and FIG. 7B depict schematically identification marks with different combinations.
Figure 7A:
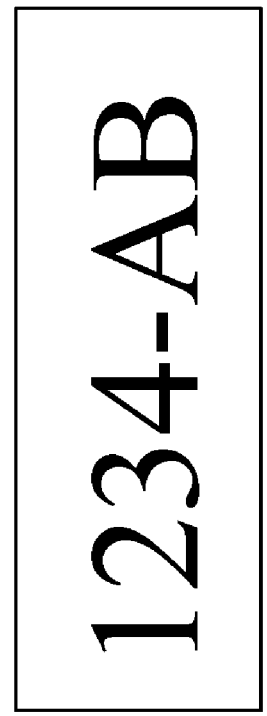

Referring to FIG. 5, since there are 7 characters in the identification mark in the present embodiment, 7 feature images can be acquired. In step 32, the feature image corresponding to each character in the identification mark is compared to a plurality of sample images in the database. In the present embodiment, the comparison process is similar to step 23 in FIG. 1 and is thus not presented herein. Moreover, step 32 further comprises step 33 to exclude images of impossible characters or digits according to various combinations that form the identification marks. For example, in one embodiment, the identification mark can be formed as a combination of 4 leading digits and 2 following letters (as shown in FIG. 7A) with a "-" therebetween. In another identification mark, 2 leading letters and 4 following digits are combined (as shown in FIG. 7B), with a "-" therebetween. In the present embodiment, there are two kinds of combinations to exemplify the license plates. Therefore, images of impossible characters or digits can be excluded according to the relative locations of the feature images in the identification mark so as to increase identification efficiency. For example, if the license plate is similar FIG. 7A, the feature images representing the leading 4 digit can be compared with the sample images representing digits in the database, the feature image corresponding to the fifth character is not compared with anything and is determined as "-", and feature images corresponding to the sixth and the seventh characters are compared with the sample image representing letters in the database.

Referring to FIG. 5, after step 23 compares each feature image with each sample image in the database, step 34 is performed to collect a plurality of similarity indexes with respect to each feature image compared with the plurality of sample images. Finally, in step 35, the similarity indexes corresponding to the identification mark are sorted. Therefore, in the present step, a plurality of combinations representing the identification mark can be obtained according to the sorting. Then in step 36, the comparison results are output. Please refer to FIG. 8A, which FIG. 8A is a table for sorting the comparison results according to the present invention. After step 35, the feature image corresponding to each character is identified to obtain a character or a digit with highest similarity and combination thereof as the first possible result shown in FIG. 8A. In this case, the suspected license plate number is possibly "1642-FV". The second, third and fourth possible results can be obtained according to the character with the second, third and fourth highest similarity. The number of results is based on the practical demand, and is thus not limited to the number in FIG. 8.

Figure 8B:
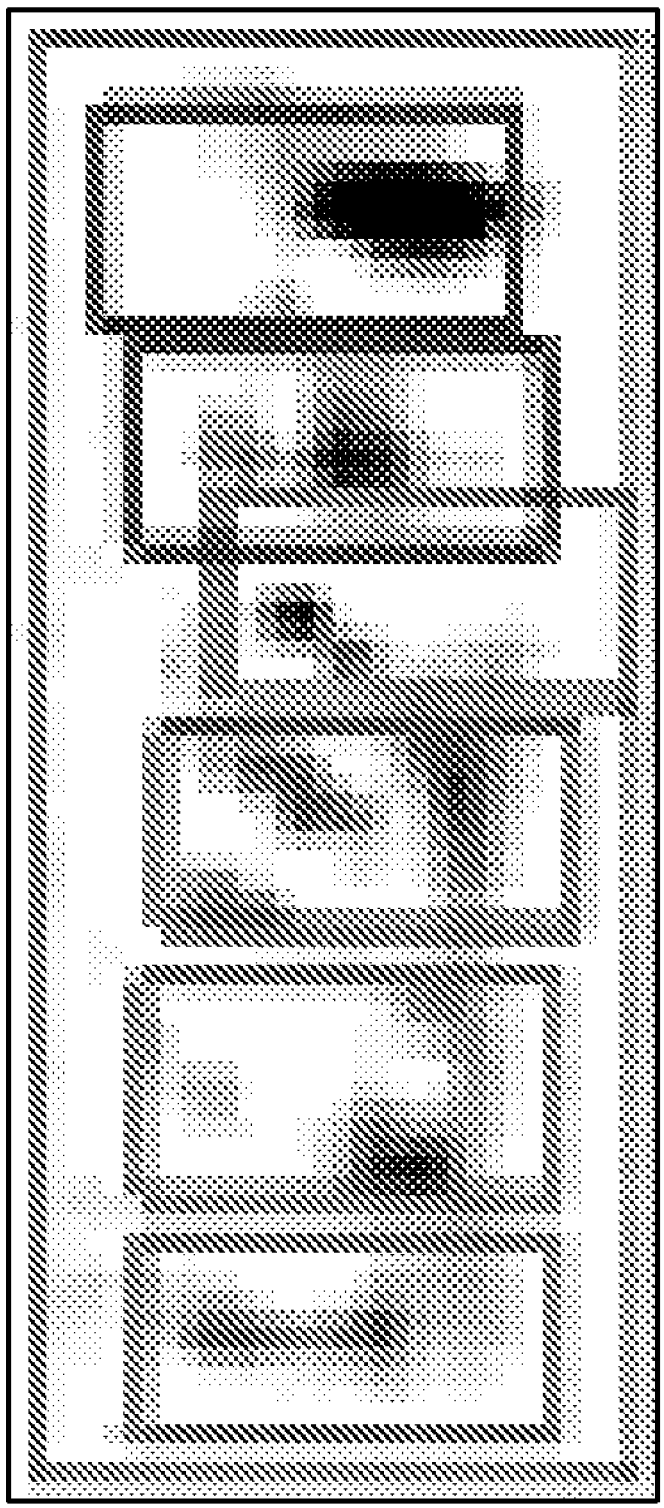
FIG. 8B is a blur image of an identification mark on a car.

In step 36 of the present invention, the possible format of the identification mark is limited to the combination of digits and/or characters so as to help the user speed up identification. The identification mark in FIG. 8A is actually 6692-RV. According to the present invention, all the characters appear in the table of FIG. 8A. Therefore, the user is able to efficiently find the correct identification mark after choosing from the results. Moreover, the user identifies the character image in the region of interest 90 (as shown in FIG. 8B) corresponding to the license plate acquired in step 36 based on visual estimation and choose from FIG. 8A. For example, according to the image in FIG. 8B, the second character is "6" according to visual estimation. As a result, the user can identify the first, and the third to the seventh characters from FIG. 8A according to the similarity indexes to obtain the identification mark from lesser combinations.

Figure 9:
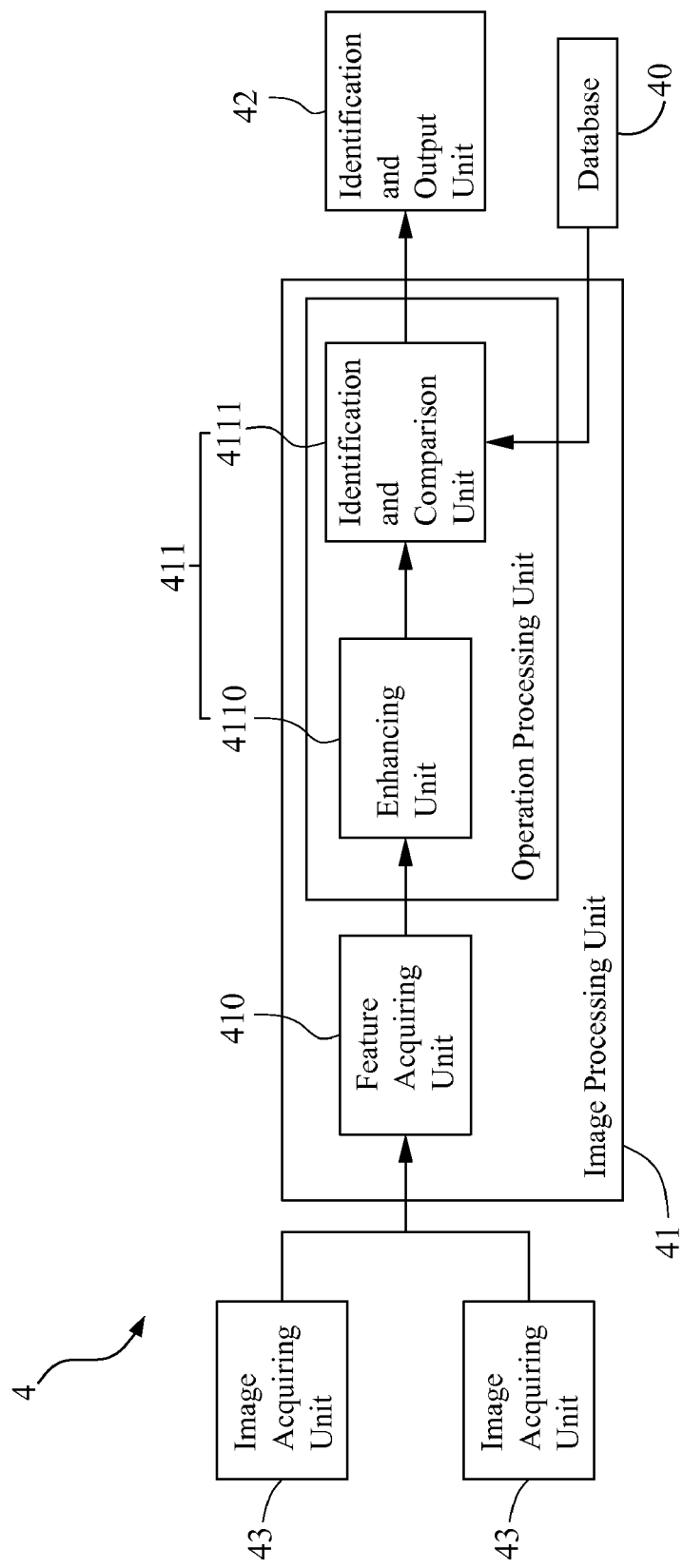
FIG. 9 is a schematic diagram of a system for image identification and identification result output according to the present invention.

Please refer to FIG. 9, which is a schematic diagram of a system for image identification and identification result output according to the present invention. The system 4 is capable of implementing the flowchart in FIG. 1 or FIG. 5 for image identification and identification result output. The system 4 comprises a database 40, an image processing unit 41, an identification and output unit 42 and a plurality of image acquiring units 43. The system 4 is capable of implementing the flowchart in FIG. 1 or FIG. 5 to output the identification results. The database 40 is capable of providing a plurality of sample images. The sample image is different from the images acquired by the image acquiring units 43 in viewing angles and distances. The plurality of image acquiring units 43 are electrically connected to the image processing unit 41. Each image acquiring unit 43 is capable of acquiring an image of an object and transmits the image to the image processing unit 41 for identification. In the present embodiment, each of the image acquiring units 43 is capable of acquiring dynamic or static images of the object. The image acquiring units may be CCD or CMOS image acquiring units, but not limited thereto. The object may be a carrier with an identification mark thereon, for example, the license plate number of a car. Moreover, the object may also be a word, a character, a digit or combinations thereof.

The image processing unit 41 comprises a feature acquiring unit 410 and an operation and processing unit 411. The feature acquiring unit 410 is capable of receiving the image to acquiring a feature image from the image. Then, the operation and processing unit 411 performs a calculation. In the present embodiment, the operation and processing unit 411 further comprises an enhancing unit 4110 and an identification and comparison unit 4111. The enhancing unit 4110 is capable of improving and normalizing the feature image (enhancing the contrast and the edge) so that the size and the angle of the feature image are identical to those of the sample image. The identification and comparison unit 4111 performs step 23 in FIG. 1 to compare the feature image with the sample image to obtain the plurality of similarity indexes corresponding thereto, and sorts the plurality of similarity indexes to output at least one of comparison results. The identification and output unit 42 is electrically connected to the processing unit 41 to output the comparison result identified by the processing unit 41. The output from the identification and output unit 42 is as shown in FIG. 8A, which is capable of allowing the user to know the identification results displayed on a display.

Accordingly, the present invention discloses a method and system for image identification and identification result output to improve speed for targeting suspected carrier and enhance the identification efficiency. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for image identification and identification result output, comprising steps of:
    providing an image;
    acquiring a feature image from the image;
    providing a plurality of sample images, each having respectively a standard image region and at least a non-standard image region, the standard image region having pixels corresponding to a first feature value respectively, and the non-standard image region having pixels corresponding to a second feature value respectively;
    performing a calculation on a third feature value of each pixel in the feature image and the first feature value or the second feature value corresponding to each pixel in the plurality of sample images to obtain a similarity index of the feature image corresponding to the plurality of sample images respectively;
    collecting a plurality of similarity indexes with respect to the feature image compared with the plurality of sample images; and
    sorting the plurality of similarity indexes and outputting at least one of comparison results,
    wherein the calculation is based on normalized correlation matching,
    wherein the first feature value and the second feature value are respectively a combination of a weight value and a greyscale value, and the third feature value is a greyscale value, and
    wherein normalized correlation matching is performed by dividing the product of the weight value corresponding to each pixel in the sample image, the difference between the greyscale value of each pixel and the average greyscale value in the sample image, and the difference between the greyscale value of each pixel and the average greyscale value in the feature image by the product of the standard deviation of the greyscale value of the sample image and the standard deviation of the greyscale value of the feature image.

2. The method for image identification and identification result output as recited in claim 1, further comprising a step of normalizing the feature image to adjust the size and the angle of the feature image so that the size of the feature image is identical to the size of the sample image after acquiring the feature image from the image.

3. The method for image identification and identification result output as recited in claim 1, wherein each sample image corresponds to an image of a digit or a character.

4. The method for image identification and identification result output as recited in claim 1, wherein the step of providing the plurality of sample images comprises the steps of:
    determining the size of the sample images;
    providing in each of the sample images the standard image region corresponding to a piece of information, and determining the first feature value corresponding to the pixels;
    providing in each of the sample images the non-standard image region corresponding to another piece of information that the piece of information is taken for, and determining the second feature value corresponding to the pixels; and
    repeating the aforegoing steps for a plurality of times to provide the plurality of sample images corresponding to different characters.

5. The method for image identification and identification result output as recited in claim 1, wherein the content in the standard image region is a piece of information corresponding to the sample image, and the content in the non-standard image region and the standard image region is another piece of information that the piece of information is taken for corresponding to the sample image.

6. A method for image identification and identification result output, comprising steps of:
   providing an image of a carrier with an identification mark thereon;
   acquiring from the image a plurality of feature images with respect to the identification mark;
   providing a plurality of sample images, each having respectively a standard image region and at least a non-standard image region, the standard image region having pixels corresponding to a first feature value respectively, and the non-standard image region having pixels corresponding to a second feature value respectively;
   performing a calculation on a third feature value of each pixel in the plurality of feature images and the first feature value or the second feature value corresponding to each pixel in the plurality of sample images to obtain a similarity index of each feature image corresponding to the plurality of sample images respectively;
   collecting a plurality of similarity indexes with respect to each feature image compared with the plurality of sample images; and
   sorting the plurality of similarity indexes corresponding to the identification mark and outputting at least one of comparison results,
   wherein the calculation is based on normalized correlation matching,
   wherein the first feature value and the second feature value are respectively a combination of a weight value and a greyscale value, and the third feature value is a greyscale value, and
   wherein normalized correlation matching is performed by dividing the product of the weight value corresponding to each pixel in the sample image, the difference between the greyscale value of each pixel and the average greyscale value in the sample image, and the difference between the greyscale value of each pixel and the average greyscale value in the feature image by the product of the standard deviation of the greyscale value of the sample image and the standard deviation of the greyscale value of the feature image.

7. The method for image identification and identification result output as recited in claim 6, further comprising a step of normalizing the feature image to adjust the size and the angle of the feature image so that the size of the feature image is identical to the size of the sample image after acquiring the feature image from the image.

8. The method for image identification and identification result output as recited in claim 6, wherein the identification mark is a license plate number.

9. The method for image identification and identification result output as recited in claim 6, wherein each sample image corresponds to an image of a digit or a character.

10. The method for image identification and identification result output as recited in claim 6, wherein each sample image is further divided into feature images acquired in front, feature images acquired slantedly and feature images acquired at least one distances.

11. The method for image identification and identification result output as recited in claim 6, further comprising a step of excluding images of impossible characters or digits according to a relative location of the feature image of the identification mark when each feature image is compared with the plurality of sample images stored in the database.

12. The method for image identification and identification result output as recited in claim 6, wherein the step of providing the plurality of sample images comprises the steps of:
   determining the size of the sample images;
   providing in each of the sample images the standard image region corresponding to a piece of information, and determining the first feature value corresponding to the pixels;
   providing in each of the sample images the standard image region corresponding to another piece of information that the piece of information is taken for, and determining the second feature value corresponding to the pixels; and
   repeating the aforegoing steps for a plurality of times to provide the plurality of sample images corresponding to different characters.

13. The method for image identification and identification result output as recited in claim 6, wherein the content in the standard image region is a piece of information corresponding to the sample image, and the content in the non-standard image region and the standard image region is another piece of information that the piece of information is taken for corresponding to the sample image.

14. A system for image identification and identification result output, comprising:
   a database capable of providing a plurality of sample images, each having respectively a standard image region and at least a non-standard image region, the standard image region having pixels corresponding to a first feature value respectively, and the non-standard image region having pixels corresponding to a second feature value respectively;
   an image acquiring unit capable of acquiring an image of an object;
   a feature acquiring unit capable of acquiring a feature image from the image;
   an operation and processing unit capable of performing a calculation on a third feature value of each pixel in the feature image and the first feature value or the second feature value corresponding to each pixel in the plurality of sample images to obtain a similarity index of the feature image corresponding to the plurality of sample images respectively, and sorting a plurality of similarity indexes and outputting at least one of comparison results; and
   an identification and output unit being connected to the operation and processing unit to output the comparison result identified by the operation and processing unit,
   wherein the calculation is based on normalized correlation matching,
   wherein the first feature value and the second feature value are respectively a combination of a weight value and a greyscale value, and the third feature value is a greyscale value, and
   wherein normalized correlation matching is performed by dividing the product of the weight value corresponding to each pixel in the sample image, the difference between the greyscale value of each pixel and the average greyscale value in the sample image, and the difference between the greyscale value of each pixel and the average greyscale value in the feature image by the product of the standard deviation of the greyscale value of the sample image and the standard deviation of the greyscale value of the feature image.

15. The system for image identification and identification result output as recited in claim 14, wherein the object is a carrier, the image of the object is an image of an identification mark on the carrier, and the identification mark is a license plate number.

16. The system for image identification and identification result output as recited in claim 14, wherein each sample image corresponds to an image of a word, a digit or a character.

17. The system for image identification and identification result output as recited in claim 14, wherein the operation and processing unit excludes images of impossible characters or digits according to a relative location of the feature image in an identification mark when each feature image is compared with the plurality of sample images stored in the database by the operation and processing unit.

18. The system for image identification and identification result output as recited in claim 14, wherein the image acquiring unit normalizes the feature image to adjust the size and the angle of the feature image so that the size of the feature image is identical to the size of the sample image after acquiring the feature image from the image.

19. The system for image identification and identification result output as recited in claim 14, wherein the operation and processing unit comprises an enhancing unit and an identification and comparison unit, wherein the enhancing unit improves and normalizes the feature image so that the size of the feature image is identical to the size of the sample image and the identification and comparison unit compares the improved and normalized feature image with the sample image to obtain the plurality of similarity indexes corresponding thereto.

20. The system for image identification and identification result output as recited in claim 14, wherein the content in the standard image region is a piece of information corresponding to the sample image, and the content in the non-standard image region and the standard image region is another piece of information that the piece of information is taken for corresponding to the sample image.

* * * * *